(12) United States Patent
Kodama

(10) Patent No.: US 12,340,463 B2
(45) Date of Patent: Jun. 24, 2025

(54) VEHICLE DISPLAY CONTROL DEVICE FOR OBJECT DETECTION FOR TRAVELING DIRECTION SIDE

(71) Applicant: TOYOTA JIDOSHA KABUSHIKI KAISHA, Toyota (JP)

(72) Inventor: Shinya Kodama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 18/217,839

(22) Filed: Jul. 3, 2023

(65) Prior Publication Data
US 2024/0096008 A1   Mar. 21, 2024

(30) Foreign Application Priority Data
Sep. 20, 2022   (JP) .................................. 2022-149615

(51) Int. Cl.
| | |
|---|---|
| *G06T 15/20* | (2011.01) |
| *B60R 1/23* | (2022.01) |
| *G06T 15/40* | (2011.01) |
| *G06V 20/58* | (2022.01) |
| *H04N 5/268* | (2006.01) |

(52) U.S. Cl.
CPC .............. *G06T 15/205* (2013.01); *B60R 1/23* (2022.01); *G06T 15/40* (2013.01); *G06V 20/58* (2022.01); *H04N 5/268* (2013.01); *B60R 2300/30* (2013.01); *B60R 2300/607* (2013.01); *B60R 2300/8093* (2013.01); *G06T 2210/62* (2013.01)

(58) Field of Classification Search
CPC ......... G06T 15/205; G06V 20/58; B60R 1/23; B60R 2300/30; B60R 2300/607; B60R 2300/8093
See application file for complete search history.

(56) References Cited

U.S. PATENT DOCUMENTS

| | | | |
|---|---|---|---|
| 9,969,261 | B2 | 5/2018 | Kodama |
| 10,045,173 | B1 | 8/2018 | Morimura et al. |
| 10,106,157 | B2 | 10/2018 | Sawada et al. |
| 10,150,407 | B2 | 12/2018 | Takahashi et al. |
| 10,696,297 | B2 | 6/2020 | Nguyen Van et al. |
| 11,001,255 | B2 | 5/2021 | Fukuman et al. |
| 11,110,937 | B2 | 9/2021 | Kinoshita et al. |
| 2012/0127312 | A1 | 5/2012 | Nagamine et al. |

(Continued)

FOREIGN PATENT DOCUMENTS

| | | |
|---|---|---|
| JP | 2004-213489 A | 7/2004 |
| JP | 2011-055480 A | 3/2011 |

(Continued)

*Primary Examiner* — Terrell M Robinson
(74) *Attorney, Agent, or Firm* — Sughrue Mion, PLLC

(57) ABSTRACT

The control unit generates a 3D view in which the vehicle and its surroundings are viewed from the set viewpoint from the captured images acquired from the imaging unit that captures an image of the surroundings of the vehicle and the polygon model indicating the vehicle, and displays the generated 3D view on the display. Here, when the obstacle detecting unit detects the obstacle 52 existing in the traveling direction of the vehicle, the viewpoint of 3D view displayed on the display can be switched to the viewpoint where the traveling direction of the vehicle 50 can be confirmed and the obstacle 52 is displayed on the display.

4 Claims, 5 Drawing Sheets

(56) References Cited

U.S. PATENT DOCUMENTS

| | | | |
|---|---|---|---|
| 2014/0085466 A1 | 3/2014 | Moriyama et al. | |
| 2017/0026618 A1* | 1/2017 | Mitsuta | H04N 23/90 |
| 2017/0330463 A1* | 11/2017 | Li | G08G 1/166 |
| 2017/0334356 A1* | 11/2017 | Fujita | G06T 15/205 |
| 2018/0178724 A1* | 6/2018 | Hatakeyama | H04N 5/265 |
| 2018/0281681 A1* | 10/2018 | Sunohara | B60R 1/27 |
| 2019/0001968 A1 | 1/2019 | Yorifuji et al. | |
| 2019/0215465 A1 | 7/2019 | Hayashi et al. | |
| 2019/0244324 A1 | 8/2019 | Watanabe et al. | |
| 2019/0275970 A1* | 9/2019 | Sato | G08G 1/168 |
| 2019/0344828 A1 | 11/2019 | Omori et al. | |
| 2019/0389488 A1 | 12/2019 | Yamada | |
| 2020/0238909 A1* | 7/2020 | Yamamoto | B60R 1/28 |
| 2021/0192230 A1* | 6/2021 | Michiguchi | H04N 7/181 |

FOREIGN PATENT DOCUMENTS

| | | |
|---|---|---|
| JP | 2013-212723 A | 10/2013 |
| JP | 2014-068308 A | 4/2014 |
| JP | 2018-063294 A | 4/2018 |
| JP | 2018-142882 A | 9/2018 |

\* cited by examiner

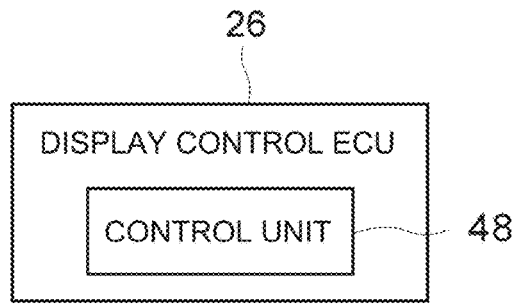
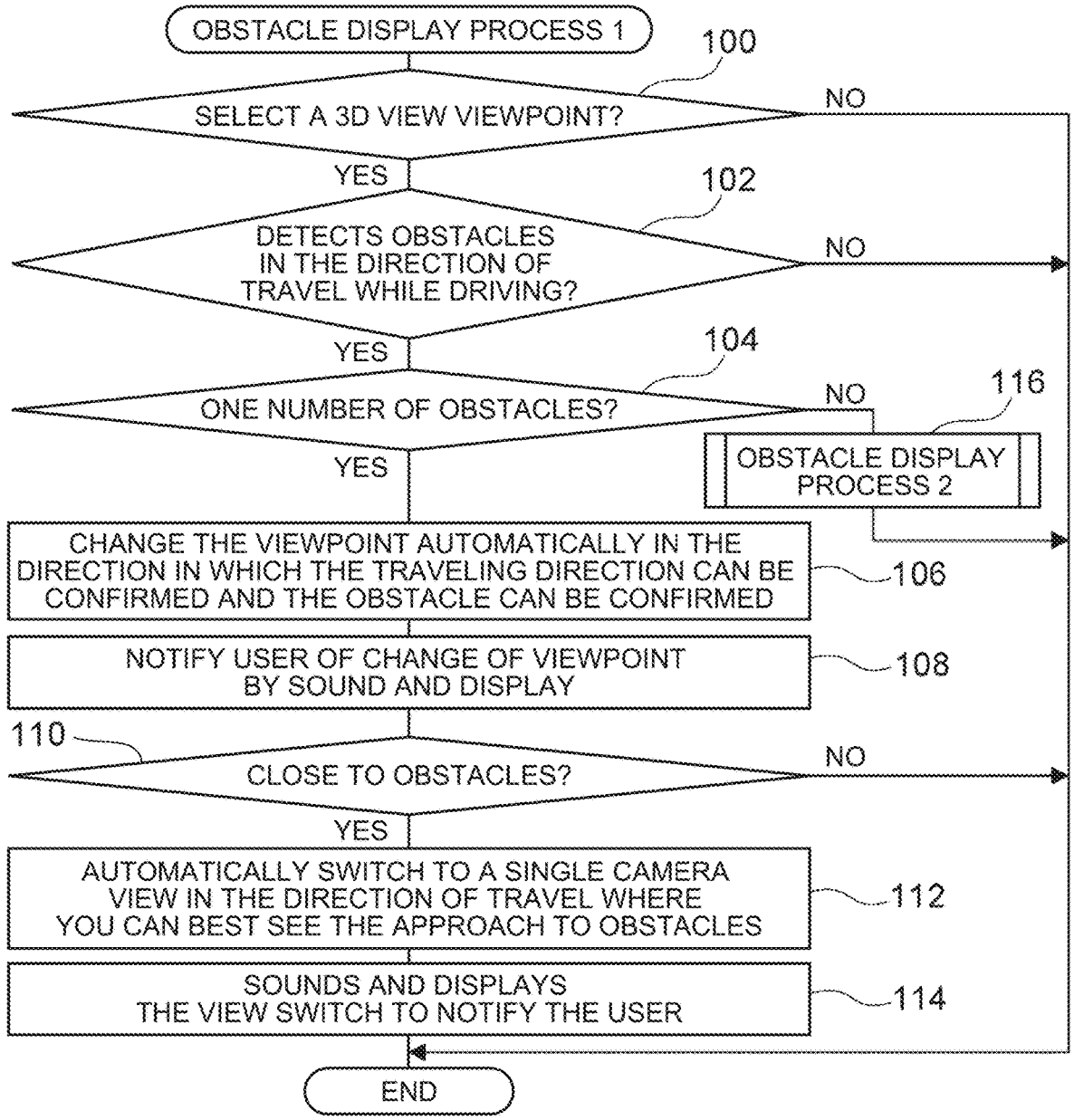

VEHICLE DISPLAY CONTROL DEVICE FOR OBJECT DETECTION FOR TRAVELING DIRECTION SIDE

CROSS-REFERENCE TO RELATED APPLICATION

This application claims priority to Japanese Patent Application No. 2022-149615 filed on Sep. 20, 2022 incorporated herein by reference in its entirety.

BACKGROUND

1. Technical Field

The present disclosure relates to a vehicle display control device.

2. Description of Related Art

In Japanese Unexamined Patent Application Publication No. 2011-55480 (JP 2011-55480 A), a fisheye image having a position in a vertical upward direction as a viewpoint is generated using a peripheral image of a vehicle captured by a plurality of imaging cameras. The generated fisheye image is combined with the own vehicle image and displayed on a display device. In the technique of JP 2011-55480 A, the viewpoint position of the fisheye image can be changed.

SUMMARY

As in the technique described in JP 2011-55480 A, in a configuration in which the user can change the viewpoint of an image to be displayed on the display unit, there is an issue that even when an obstacle is present on the traveling direction side of the vehicle, the obstacle may not be displayed on the display unit depending on the viewpoint selected by the user.

The present disclosure has been made in consideration of the above-described facts, and an object thereof is to provide a vehicle display control device capable of displaying an obstacle on a display unit when the obstacle is present on the traveling direction side of the vehicle.

A vehicle display control device according to a first aspect includes a control unit that: generates an image that looks down at a vehicle and its surroundings from a set viewpoint from a captured image acquired from an imaging unit that captures an image of the surroundings of the vehicle and a polygon model that shows the vehicle; causes a display unit to display the generated image; and switches a viewpoint of the image to be displayed on the display unit to a viewpoint where a traveling direction of the vehicle is confirmable and an obstacle is displayed on the display unit, when the obstacle is detected by an obstacle detection unit that detects an obstacle present on the traveling direction side of the vehicle.

In the first aspect, an image that looks down at a vehicle and its surroundings from a set viewpoint is generated from a captured image acquired from an imaging unit that captures an image of the surroundings of the vehicle and a polygon model that shows the vehicle. The generated image is displayed on the display unit. In the first aspect, a viewpoint of the image to be displayed on the display unit is switched to a viewpoint where a traveling direction of the vehicle is confirmable and an obstacle is displayed on the display unit, when the obstacle is detected by an obstacle detection unit that detects an obstacle present on the traveling direction side of the vehicle. Accordingly, when an obstacle is present on the traveling direction side of the vehicle, the obstacle can be displayed on the display unit, and the user can recognize the presence of the obstacle and the positional relationship with the vehicle.

According to a second aspect, in the first aspect, in a case where a plurality of obstacles is detected by the obstacle detection unit, the obstacles are grouped by directions in which the obstacles exist, and a plurality of groups of the obstacles is obtained, when a group of first obstacles having a smallest distance from the vehicle is present among the groups of the obstacles, and a group of second obstacles having a difference less than a predetermined value is not present, the difference being a difference from the group of the first obstacles with respect to a distance from the vehicle, the control unit switches the viewpoint of the image to be displayed on the display unit to a viewpoint where the traveling direction of the vehicle is confirmable and an obstacle belonging to the group of the first obstacles is displayed on the display unit, and makes a display of the vehicle in the image transparent.

When a plurality of obstacles is detected by the obstacle detection unit, the obstacles are grouped according to the direction in which the obstacles exist, and a plurality of groups of obstacles is obtained, which group is preferentially displayed becomes an issue. In the second aspect, when there is a group of first obstacles having the smallest distance from the vehicle among the groups of the obstacles and there is no group of second obstacles having the difference from the group of the first obstacles with respect to the distance from the vehicle that is less than the predetermined value, the following processing is performed. That is, the viewpoint of the image to be displayed on the display unit is switched to a viewpoint where the traveling direction of the vehicle is confirmable and an obstacle belonging to the group of the first obstacles is displayed on the display unit, and the display of the vehicle is made transparent. As a result, the group of the first obstacles having the smallest distance to the vehicle is preferentially displayed on the display unit, and the display of the vehicle is made transparent, so that the user can recognize the presence of the group of the first obstacles having the smallest distance to the vehicle and the positional relationship with the vehicle. The presence of an obstacle other than the first obstacles can also be recognized by the user.

According to a third aspect, in the first aspect, in a case where a plurality of obstacles is detected by the obstacle detection unit, the obstacles are grouped by directions in which the obstacles exist, and a plurality of groups of the obstacles is obtained, when a group of first obstacles having a smallest distance from the vehicle is present among the groups of the obstacles, and a group of second obstacles having a difference less than a predetermined value is also present, the difference being a difference from the group of the first obstacles with respect to a distance from the vehicle, the control unit switches the viewpoint of the image to be displayed on the display unit to a viewpoint where an obstacle belonging to the group of the first obstacles and an obstacle belonging to the group of the second obstacles are each displayed on the display unit, and when there is an obstacle hidden in a display of the vehicle in the image, the control unit makes the display of the vehicle transparent.

In the third aspect, when there is a group of first obstacles having the smallest distance from the vehicle among the groups of the obstacles and there is also a group of second obstacles having the difference from the group of the first obstacles with respect to the distance from the vehicle that is less than the predetermined value, the control unit performs the following processing. That is, the control unit switches the viewpoint to be displayed on the display unit to a viewpoint where an obstacle belonging to the group of the first obstacles and an obstacle belonging to the group of the second obstacles are each displayed on the display unit, and when there is an obstacle hidden in a display of the vehicle in the image, the control unit makes the display of the vehicle transparent. Thus, in the third aspect, the user can recognize the presence of the group of the first obstacles having the smallest distance from the vehicle and the group of the second obstacles having the difference from the group of the first obstacles with respect to the distance from the vehicle that is less than the predetermined value.

According to a fourth aspect, in any of the first to third aspects, the imaging unit includes a plurality of cameras having different imaging ranges, and when the vehicle further approaches the obstacle after the obstacle is detected by the obstacle detection unit, the control unit causes the display unit to display an image of the traveling direction side of the vehicle, the image being an image captured by a single camera that captures an image of a range in which an approach state between the obstacle and the vehicle is confirmable.

In the fourth aspect, when the vehicle further approaches the obstacle after the obstacle is detected by the obstacle detection unit, the control unit causes the display unit to display an image of the traveling direction side of the vehicle, the image being an image captured by a single camera that captures an image of a range in which an approach state between the obstacle and the vehicle is confirmable. Accordingly, the user can grasp the approach state between the vehicle and the obstacle by using an image in which the approach state between the vehicle and the obstacle can be best grasped.

According to a fifth aspect, in any one of the first to third aspects, the control unit makes a notification by a notification unit when switching the viewpoint of the image to be displayed on the display unit.

According to the fifth aspect, the user can recognize that the viewpoint of the image to be displayed on the display unit is switched.

The present disclosure has an effect that when an obstacle is present on the traveling direction side of the vehicle, the obstacle can be displayed on the display unit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a functional diagram of a display-control ECU;

FIG. 3 is a flowchart showing an obstacle display process 1;

DETAILED DESCRIPTION OF EMBODIMENTS

Figure 1:
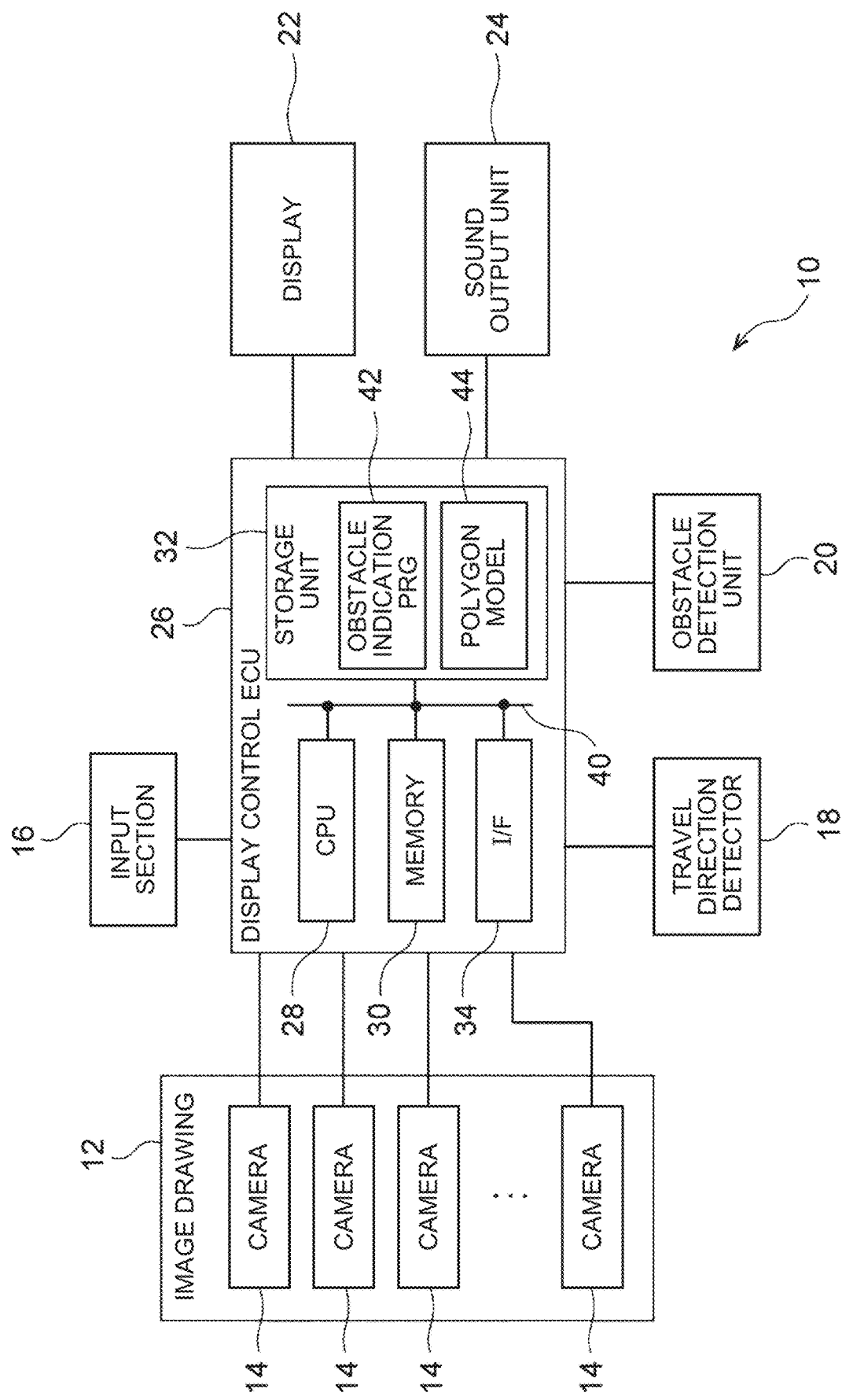
FIG. 1 is a block diagram illustrating a schematic configuration of a vehicle display device according to an embodiment.

Hereinafter, an example of an embodiment of the present disclosure will be described in detail with reference to the drawings. As illustrated in FIG. 1, the vehicular display device 10 according to the present embodiment includes an imaging unit 12, an input unit 16, a traveling direction detection unit 18, an obstacle detection unit 20, a display 22, an audio output unit 24, and a display control ECU 26.

The imaging unit 12 is a functional block that captures an image of the surroundings of the vehicle. The imaging unit 12 includes a plurality of cameras 14. The plurality of cameras 14 are mounted on the vehicle. In the plurality of cameras 14, the mounting position and the imaging range are set so as to capture images of different ranges of the entire circumference of the vehicle from different positions. In the present embodiment, the imaging unit 12 includes, for example, four cameras so as to be able to generate an image (3D view) of a vehicle and its surroundings from an arbitrary viewpoint from an image captured by the plurality of cameras 14. However, the number of cameras 14 in the imaging unit 12 is not limited to four.

The input unit 16 is a functional block for a user (for example, an occupant of a vehicle) to input information. The input unit 16 includes, for example, a four-way switch, a keyboard, or the like. The information input by the user via the input unit 16 includes information specifying a viewpoint of 3D view when images (3D views) of the vehicles and their surroundings are displayed on the display 22. In the present embodiment, the viewpoint of 3D view may be designated by selecting a predetermined number of viewpoints (for example, eight viewpoints set discretely). Further, in the present embodiment, any viewpoint that can be continuously changed may be set for designating the viewpoint of 3D view.

The traveling direction detection unit 18 is a functional block that detects a traveling direction of the vehicle. For example, the traveling direction detection unit 18 includes a shift position sensor that can detect whether the vehicle moves forward or backward, and a steering angle sensor that detects a steering angle of the vehicle.

The obstacle detection unit 20 is a functional block that detects an obstacle existing on the traveling direction side of the vehicle (a direction within a predetermined angular range on the left and right with the traveling direction of the vehicle as a center). The obstacle detection unit 20 includes a sensor that detects an obstacle. The sensor for detecting an obstacle includes at least one of a clearance sonar, a millimeter wave radar, a camera, and a lidar. Note that the obstacle detection unit 20 is an example of an obstacle detection unit in the present disclosure.

The display 22 includes a center display, a meter display, or the like. The center display is disposed at a center portion in the vehicle width direction of the vehicle cabin. The meter display is disposed in front of a driver's seat of the vehicle in a vehicle cabin. On the display 22, images (for example, images such as 3D views) generated by the display control ECU 26 are displayed. Note that the display 22 is an example of a display unit in the present disclosure.

The sound output unit 24 includes a buzzer for outputting a buzzer sound, a speaker capable of outputting an arbitrary sound, and the like. The sound output unit 24 is controlled by the display control ECU 26 so that a predetermined sound is output when the viewpoint of 3D view displayed on the display 22 is switched. The audio output unit 24 is an example of a notification unit in the present disclosure.

The display control ECU 26 includes a Central Processing Unit (CPU) 28, a memory 30, and a non-volatile storage unit 32. The memories 30 are Read Only Memory (ROM), Random Access Memory (RAM), and the like. The storage unit 32 is a Hard Disk Drive (HDD), Solid State Drive, or the like. The display control ECU 26 also includes an Inter Face (I/F) 34. I/F unit 34 is connected to the imaging unit 12, the input unit 16, the traveling-direction detecting unit 18, the obstacle detection unit 20, the display 22, and the sound output unit 24. CPU 28, the memories 30, the storage unit 32, and I/F unit 34 are connected to the inner buses 40, respectively, and can communicate with each other.

Figure 5:
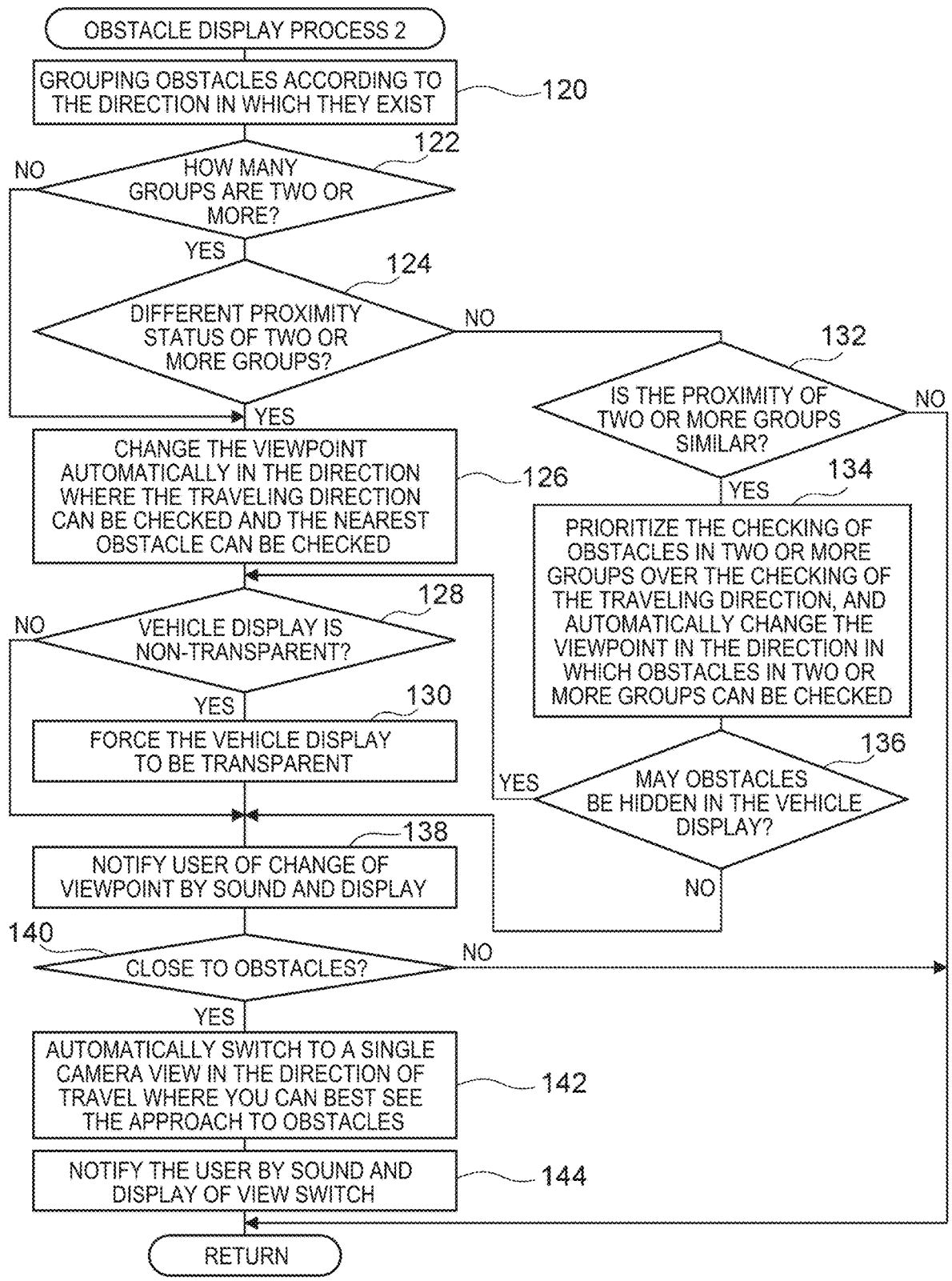
FIG. 5 is a flowchart showing the obstacle display process 2.

The storage unit 32 of the display control ECU 26 stores an obstacle display program 42 and a polygon model 44 indicating vehicles. The display control ECU 26 reads the obstacle display program 42 from the storage unit 32 and develops it in the memory 30. The display control ECU 26 executes the obstacle display program 42 loaded in the memory 30 by CPU 28. Thus, the display control ECU 26 functions as the control unit 48 illustrated in FIG. 2. The display control ECU 26 performs an obstacle display process 1 (FIG. 3) and an obstacle display process 2 (FIG. 5), which will be described later. Note that the display control ECU 26 is an exemplary vehicle display control device according to the present disclosure.

The control unit 48 generates an image (3D view) of the vehicle 50 (see FIGS. 4A to 4C, and FIGS. 6A to 6D) and the surroundings thereof from the set viewpoint from the captured image acquired from the imaging unit 12 that captures an image of the surroundings of the vehicle and the polygon model 44 indicating the vehicle. The control unit 48 displays the generated image on the display 22. When the obstacle detection unit 20 detects the obstacle, the control unit 48 switches the viewpoint of the image to be displayed on the display 22 to the viewpoint where the traveling direction of the vehicle can be confirmed and the obstacle is displayed on the display 22. The obstacle detection unit 20 detects an obstacle existing on the traveling direction side of the vehicle.

Next, referring to FIG. 3, an obstacle display process 1 executed by the display control ECU 26 (control unit 48) while the vehicle is traveling will be described as an operation of the present embodiment.

In step 100 of the obstacle display process 1, the control unit 48 determines whether or not the viewpoint of 3D view is selected by the user via the input unit 16. When the determination in step 100 is negative, the control unit 48 generates, for example, a 3D view of a preset viewpoint (for example, a viewpoint vertically upward with respect to vehicles). Thereafter, the control unit 48 performs a process of displaying the generated 3D view on the display 22. Then, the control unit 48 ends the obstacle display process 1.

When the determination in step 100 is affirmative, the control unit 48 generates, for example, a 3D view of the viewpoint selected via the input unit 16. After that, after the control unit 48 performs a process of displaying the generated 3D view on the display 22, the process proceeds to step 102. In step 102, the control unit 48 acquires information on the traveling direction of the vehicle detected by the traveling direction detection unit 18. In addition, the control unit 48 acquires the information of the obstacle detected by the obstacle detection unit 20. Then, the control unit 48 determines whether or not an obstacle existing on the traveling direction side of the vehicle is detected while the vehicle is traveling on the basis of the obtained both pieces of information.

When the determination in step 102 is negative, the control unit 48 ends the obstacle display process 1. If the determination in step 102 is affirmative, the process proceeds to step 104. In step 104, the control unit 48 determines whether or not the number of obstacles detected on the traveling direction side of the vehicle is one. If the determination in step 104 is affirmative, the process proceeds to step 106.

Figure 4A:
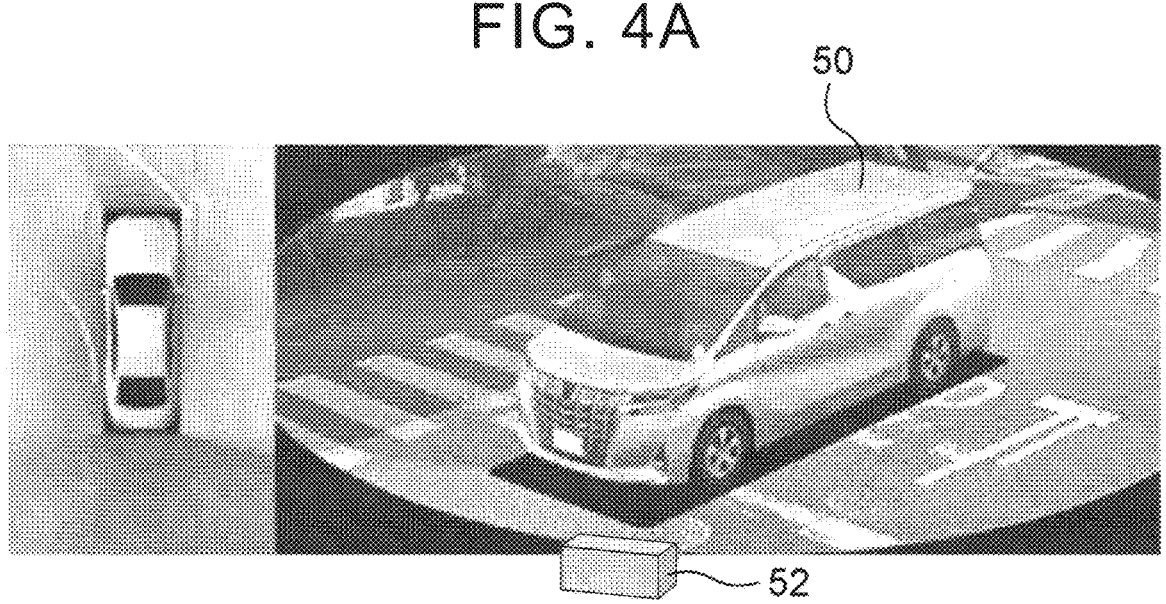
FIG. 4A is an image diagram illustrating a view displayed on a display in an obstacle display process.
Figure 4B:
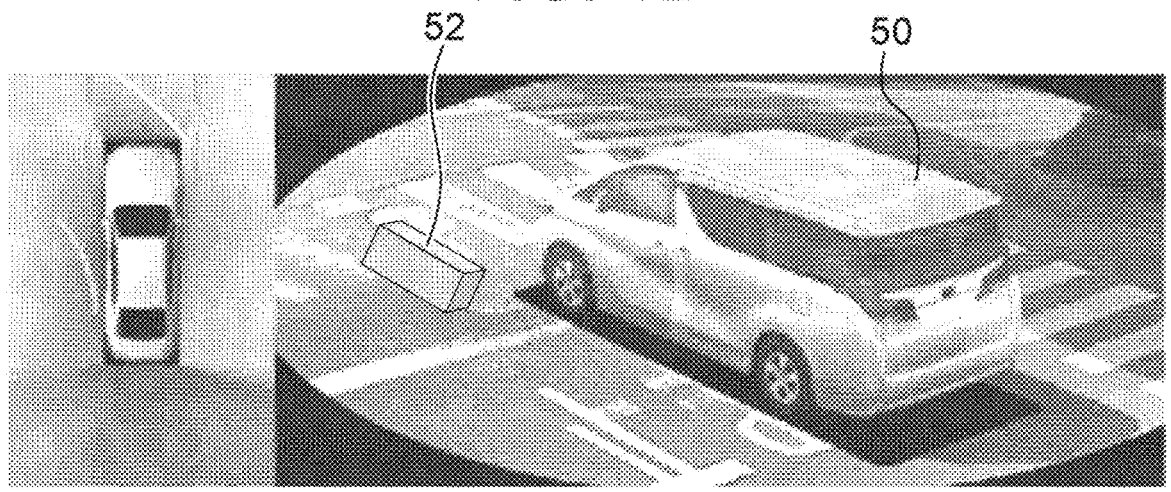
FIG. 4B is an image diagram illustrating a view displayed on a display in an obstacle display process.

Here, 3D view displayed on the display 22 is a viewpoint selected by the user. Therefore, as illustrated in FIG. 4A, the obstacles 52 may be hardly reflected in 3D view. Therefore, in step 106, the control unit 48 automatically changes the viewpoint of 3D view displayed on the display 22 to a direction in which the traveling direction of the vehicle can be confirmed and the detected obstacle can be confirmed. As a result, as shown in FIG. 4B, the user who visually recognizes 3D view displayed on the display 22 can recognize the presence of the obstacle 52 and the positional relation with the vehicles 50.

In the viewpoint change described above, first, a 3D view is generated for a plurality of viewpoints. From the respective generated 3D views, a 3D view is selected in which the size of the imaged area corresponding to the detected obstacle is maximized. Thus, the viewpoint can be changed. The selection of 3D view in the viewpoint change may be performed by considering whether or not the area between the vehicle and the obstacle is shown in 3D view in addition to the size of the imaging area corresponding to the obstacle.

In the next step 108, the control unit 48 causes the sound output unit 24 to output a predetermined sound (for example, a sound "pip"). In addition, the control unit 48 causes the display 22 to display a predetermined icon (for example, an icon indicating a viewpoint change). Thus, the control unit 48 notifies the user that the viewpoint of 3D view displayed on the display 22 has been changed. This allows the user to recognize that the viewpoint of 3D view displayed on the display 22 has been switched.

In step 110, the control unit 48 acquires the obstacle information from the obstacle detection unit 20. The control unit 48 determines whether or not the vehicle has approached the obstacle by a predetermined distance or more from the point of time when the viewpoint is changed in step 106. When the determination in step 110 is negative, the control unit 48 ends the obstacle display process 1. If the determination in step 110 is affirmative, the process proceeds to step 112.

Figure 4C:
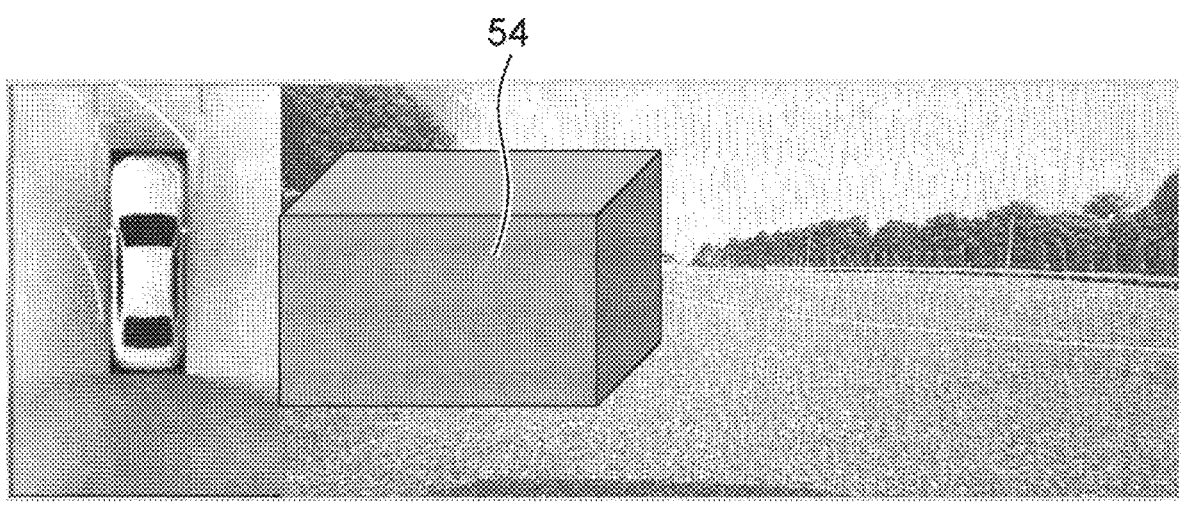
FIG. 4C is an image diagram illustrating a view displayed on a display in an obstacle display process.

In step 112, the control unit 48 switches the view displayed on the display 22 to a traveling-direction-side image (2D view) of the vehicle captured by the single camera 14 that captures an image of a range in which the approach state between the obstacle and the vehicle can be confirmed. An exemplary 2D view displayed on the display 22 in step 112 is shown in 4C. 2D view illustrated in FIG. 4C is a view capable of grasping an approach state between the vehicles and the obstacle 54. In 2D view shown in FIG. 4C, the user can be made to recognize the approach state between the vehicles and the obstacles.

In the next step 114, the control unit 48 causes the sound output unit 24 to output a predetermined sound (for example, a sound "pip"). In addition, the control unit 48 causes the display 22 to display a predetermined icon (for example, an icon indicating switching of a view). As a result, the control unit 48 notifies the user that the view displayed on the display 22 has been switched. This allows the user to recognize that the view displayed on the display 22 has been switched.

Further, in the previous step 104, when the number of obstacles detected on the traveling direction side of the vehicle is two or more, the determination in step 104 is negative. The process then proceeds to step 116. In step 116, the control unit 48 performs the obstacle display process 2. Hereinafter, the obstacle display process 2 will be described with reference to FIG. 5.

Figure 6A:
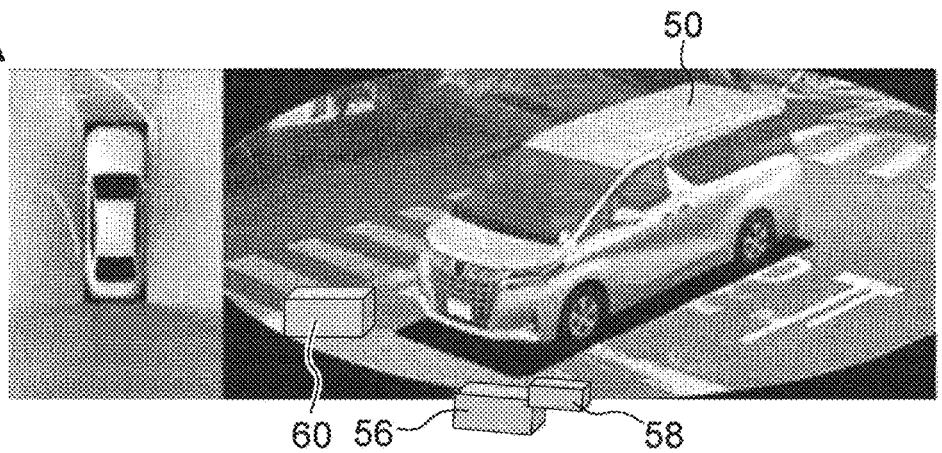
FIG. 6A is an image diagram illustrating an exemplary view displayed in an obstacle display process 2.
Figure 6B:
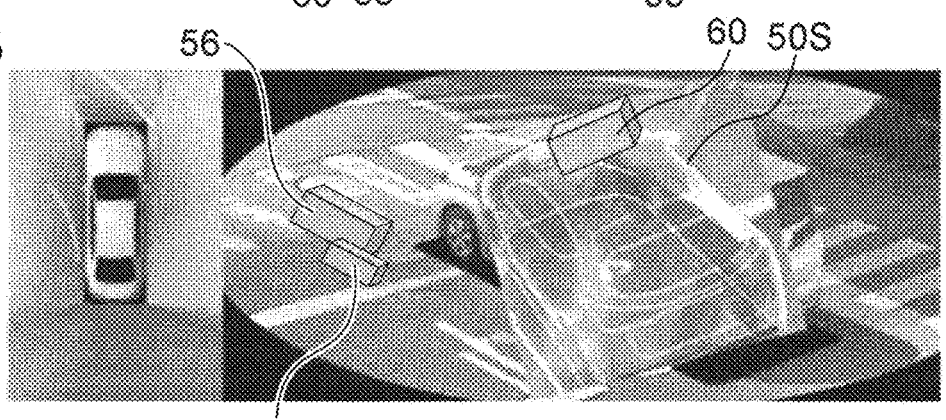
FIG. 6B is an image diagram illustrating an exemplary view displayed in an obstacle display process 2.

In step 120 of the obstacle display process 2, the control unit 48 groups the plurality of detected obstacles according to the directions in which the respective obstacles exist. For example, as illustrated in FIG. 6A, when three obstacles 56, 58, and 60 are detected in the traveling direction of the vehicle 50, the control unit 48 groups the obstacles 56 and 58, which are relatively close in the existing direction, into one group. In addition, the control unit 48 groups the obstacles 60 into one group.

In step 122, the control unit 48 determines whether or not the number of obtained groups is two or more as a result of the grouping in step 120. If a plurality of detected obstacles is grouped into one group, the determination in step 122 is negative. The process then proceeds to step 126. If the detected obstacles are grouped into two or more groups, the determination in step 122 is affirmative. The process then proceeds to step 124.

In step 124, the control unit 48 evaluates the proximity state (distance) between each of the two or more groups and the vehicle. Note that, for example, a distance from a vehicle in an obstacle having the smallest distance from the vehicle among the obstacles belonging to the group may be applied to the proximity state (distance) between one group of obstacles and the vehicle. In addition, the average value of the distances between the individual obstacles belonging to the group and the vehicle may be applied to the proximity state (distance) between the group of one obstacle and the vehicle. Then, the control unit determines whether or not the proximity state between each of the two or more groups and the vehicle is different.

For example, if there is a group of first obstacles having the smallest distance to the vehicle in the group of two or more obstacles, and there is no group of second obstacles having the difference from the group of first obstacles with respect to the distance to the vehicle that is less than the predetermined value, the determination of step 124 is affirmative. The process then proceeds to step 126. In step 126, the control unit 48 automatically changes the viewpoint of 3D view displayed on the display 22 to a direction in which the traveling direction can be confirmed and the obstacle belonging to the group of the nearest first obstacle can also be confirmed. Thus, when the group of the nearest first obstacle is a group to which the obstacles 56 and 58 belong, the user who visually recognizes 3D view displayed on the display 22 can recognize the presence of the obstacles 56 and 58 and the positional relation with the vehicles 50 as shown in 6B.

First, a 3D view is generated for a plurality of viewpoints. From the respective generated 3D views, a 3D view is selected in which the size of the image-area corresponding to the obstacle belonging to the group of the first obstacle is the largest. This makes it possible to change the viewpoint in step 126. The selection of 3D view in the viewpoint change may be performed by considering whether or not an area between the vehicle and the obstacle is visible in addition to the size of the imaging area corresponding to the obstacle.

In step 128, the control unit 48 determines whether or not the display of the vehicles in 3D view displayed on the display 22 is non-transparent. If the determination in step 128 is affirmative, the process proceeds to step 130. Then, in step 130, the control unit 48 forcibly makes the display of the vehicle transparent among 3D views displayed on the display 22 (see also the vehicle 50S of the transparent display shown in FIG. 6B). As a result, the obstacle 60 that is closer to the vehicle than the group of the first obstacle (the distance from the vehicle is larger) can cause the user who visually recognizes 3D view displayed on the display 22 to recognize the presence. If the determination in step 128 is negative, the process skips step 130 and proceeds to step 138.

On the other hand, if the determination in step 124 is negative, the process proceeds to step 132. In step 132, the control unit 48 determines whether or not the proximity state (distance) between the two or more groups of obstacles and the vehicle is similar. For example, if there is a group of first obstacles having the smallest distance to the vehicle among the two or more groups of obstacles, and there is also a group of second obstacles having a difference from the group of first obstacles with respect to the distance to the vehicle that is less than the predetermined value, the determination of step 132 is affirmative. If the determination in step 132 is affirmative, the process proceeds to step 134. If the determination in step 132 is negative, the obstacle display process 2 is ended.

Figure 6C:
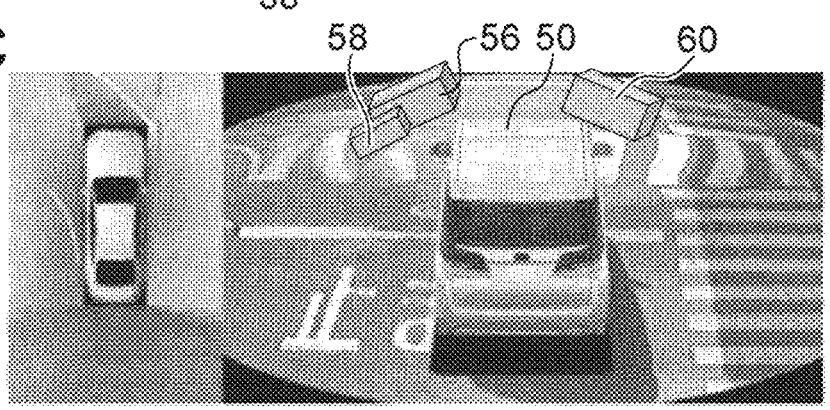
FIG. 6C is an image diagram illustrating a view displayed on a display in an obstacle display process 2.
Figure 6D:
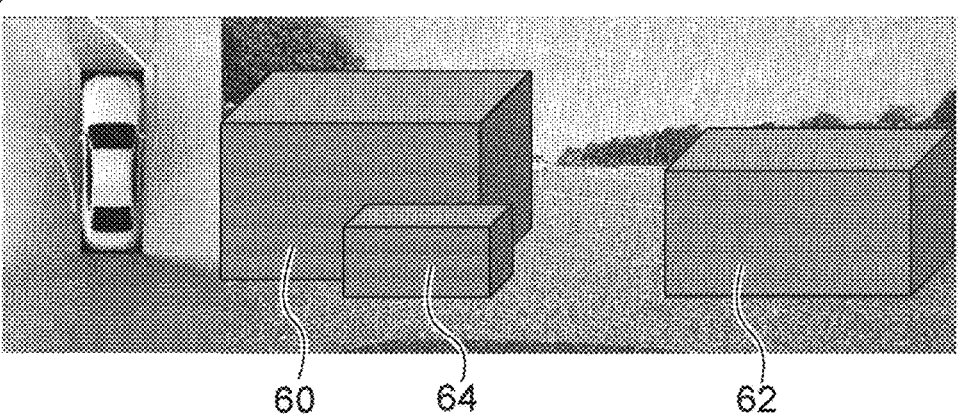
FIG. 6D is an image diagram illustrating an exemplary view displayed in an obstacle display process 2.

In step 134, the control unit 48 prioritizes the confirmation of each obstacle belonging to a group of two or more obstacles over the confirmation of the traveling direction of the vehicle. The control unit 48 automatically changes the viewpoint of 3D view displayed on the display 22 so that the obstacles belonging to two or more groups of obstacles can be checked. As a result, as shown in FIG. 6C as an example, it is possible to allow the user who has visually recognized 3D view displayed on the display 22 to recognize the presence of the obstacles 56, 58, and 60 having the same degree of proximity to the vehicles. As an illustration, 3D views are each generated for a plurality of viewpoints. In each of the generated 3D views, a 3D view is selected in which the size of the images corresponding to the obstacles belonging to two or more groups of obstacles, for example, the mean value indicates the largest value. This makes it possible to change the viewpoint in step 134.

In step 136, the control unit 48 determines whether any obstacle among the obstacles belonging to the group of two or more obstacles is likely to be hidden in the display of the vehicle in accordance with the viewpoint change in step 134. If the determination in step 136 is affirmative, the process proceeds to step 128. As a result, through the above-described steps 128 and 130, the display of the vehicles in 3D view displayed on the display 22 is forcibly made transparent. Therefore, it is possible to cause the user to recognize the presence of an obstacle that may be hidden in the display of the vehicle in accordance with the viewpoint change in step 134. If the determination at step 136 is negative, the process proceeds to step 138.

In step 138, the control unit 48 causes the sound output unit 24 to output a predetermined sound (for example, a sound "pip"). In addition, the control unit 48 causes the display 22 to display a predetermined icon (for example, an icon indicating a viewpoint change). This notifies the user that the viewpoint of 3D view displayed on the display 22 has been changed. This allows the user to recognize that the viewpoint of 3D view displayed on the display 22 has been switched.

In step 140, the control unit 48 acquires the obstacle information from the obstacle detection unit 20. From the point of time when the viewpoint is changed in step 126 or step 134, the control unit 48 determines whether or not the vehicle has approached the obstacle by a predetermined distance or more. If the determination in step 140 is negative, the obstacle display process 2 is ended. If the determination in step 140 is affirmative, the process proceeds to step 142.

In step 142, the control unit 48 switches the view displayed on the display 22 to a traveling-direction-side image (2D view) of the vehicle captured by the single camera 14 that captures an image of a range in which the approach state between the obstacle and the vehicle can be confirmed. An exemplary 2D view displayed on the display 22 in step 142 is shown in 6D. According to 2D view shown in FIG. 6D, the approaching state between the vehicles and the obstacles 62, 64, and 66 can be grasped.

In the next step 144, the control unit 48 causes the sound output unit 24 to output a predetermined sound (for example, a sound "pip"). In addition, the control unit 48 causes the display 22 to display a predetermined icon (for example, an icon indicating view switching). This notifies the user that the view displayed on the display 22 has been switched. This allows the user to recognize that the view displayed on the display 22 has been switched.

As described above, in the present embodiment, the control unit 48 generates an image (3D view) in which the vehicle and its surroundings are viewed from the set viewpoint from the captured image acquired from the imaging unit 12 that captures an image of the surroundings of the vehicle and the polygon model 44 indicating the vehicle. The control unit 48 displays the generated 3D view on the display 22. In addition, when an obstacle is detected by the obstacle detection unit 20 that detects an obstacle existing in the traveling direction of the vehicle, the control unit 48 switches the viewpoint of 3D view displayed on the display 22 to the viewpoint where the traveling direction of the vehicle can be confirmed and the obstacle is displayed on the display 22. Accordingly, when an obstacle is present on the traveling direction side of the vehicle, the obstacle can be displayed on the display 22. The presence of an obstacle can be recognized by the user.

Further, in the present embodiment, the control unit 48 detects a plurality of obstacles by the obstacle detection unit 20. The control unit 48 obtains a plurality of groups of obstacles when a plurality of obstacles is grouped according to the direction in which the obstacles exist. When there is a group of first obstacles having the smallest distance from the vehicle among the plurality of obstacle groups and there is no group of second obstacles having the difference from the group of first obstacles with respect to the distance from the vehicle that is less than the predetermined value, the control unit 48 switches the viewpoint of 3D view displayed on the display 22 to the viewpoint where the traveling direction of the vehicle can be confirmed and the obstacles belonging to the group of first obstacles are displayed on the display 22. The control unit 48 transparently displays the vehicles in 3D view. As a result, the group of the first obstacle having the smallest distance from the vehicle is preferentially displayed on the display 22, and the display of the vehicle is made transparent, so that the user can recognize the presence of the group of the first obstacle having the smallest distance from the vehicle.

Further, in the present embodiment, the control unit 48 detects a plurality of obstacles by the obstacle detection unit 20. The control unit 48 obtains a plurality of groups of obstacles when the plurality of obstacles is grouped according to the direction in which the obstacles exist. When there is a first obstacle group having the smallest distance to the vehicle among the plurality of obstacle groups, and there is a second obstacle group having a difference from the first obstacle group with respect to the distance to the vehicle that is less than the predetermined value, the control unit 48 switches the viewpoint of 3D view displayed on the display 22 to the viewpoint where the obstacle belonging to the first obstacle group and the obstacle belonging to the second obstacle group are displayed on the display 22, respectively. When there is an obstacle hidden in the display of the vehicle in 3D view, the control unit 48 makes the display of the vehicle transparent. This allows the user to recognize the presence of a group of first obstacles having the smallest distance to the vehicle and a group of second obstacles having a difference from the group of first obstacles with respect to the distance to the vehicle less than a predetermined value.

In addition, in the present embodiment, the imaging unit 12 includes a plurality of cameras 14 having different imaging ranges. After the obstacle is detected by the obstacle detection unit 20, if the vehicle further approaches the obstacle, the control unit 48 causes the display 22 to display an image (2D view) of the traveling direction-side of the vehicle captured by the single camera 14 that captures an image of a range in which the approach state between the obstacle and the vehicle can be confirmed. This makes it possible to allow the user to grasp the approach state between the vehicle and the obstacle by using images (2D views) in which the approach state between the vehicle and the obstacle can be best grasped.

Further, in the present embodiment, when the control unit 48 switches the viewpoint of 3D view displayed on the display 22, the control unit 48 notifies by the sound output unit 24 and the display 22. This allows the user to recognize that the viewpoint of 3D view to be displayed on the display 22 is switched.

Note that, in the above-described embodiment, a mode has been described in which the same sound ("beep") is outputted between the first case in which the viewpoint of 3D view is switched and the second case in which 3D view is switched to 2D view. However, the present disclosure is not limited thereto. The audio output in the first case and the second case may be different.

Further, the vehicle display control device according to the present disclosure is also applicable to manual driving of a vehicle capable of automatic driving.

What is claimed is:

1. A vehicle display control device comprising a processor that:
   generates an image that looks down at a vehicle and its surroundings from a set viewpoint from a captured image acquired from one or more cameras that captures an image of the surroundings of the vehicle and a polygon model that shows the vehicle;
   causes a display to display the generated image; and
   switches a viewpoint of the image to be displayed on the display to a viewpoint where a traveling direction of the vehicle can be visually recognized and an obstacle is displayed on the display, when the obstacle is detected by one or more sensors that detects an obstacle present on the traveling direction side of the vehicle, wherein in a case where a plurality of obstacles is detected by the one or more sensors, the obstacles are grouped by directions in which the obstacles exist, and a plurality of groups of the obstacles is obtained, when a group of first obstacles having a smallest distance from the vehicle is present among the groups of the obstacles, and a group of second obstacles having a difference less than a predetermined value is not present, the difference being a difference from the group of the first obstacles with respect to a distance from the vehicle, the processor switches the viewpoint of the image to be displayed on the display to a viewpoint where the traveling direction of the vehicle can be visually recognized and an obstacle belonging to the group of the first obstacles is displayed on the display, and makes a display of the vehicle in the image transparent.

2. The vehicle display control device according to claim 1, wherein:

the one or more cameras includes a plurality of cameras having different imaging ranges; and when the vehicle further approaches the obstacle after the obstacle is detected by the one or more sensors, the processor causes the display to display an image of the traveling direction side of the vehicle, the image being an image captured by a single camera that captures an image of a range in which an approach state between the obstacle and the vehicle can be visually recognized.

3. The vehicle display control device according to claim 1, wherein the processor makes a notification when switching the viewpoint of the image to be displayed on the display.

4. A vehicle display control device comprising a processor that:

generates an image that looks down at a vehicle and its surroundings from a set viewpoint from a captured image acquired from one or more cameras that captures an image of the surroundings of the vehicle and a polygon model that shows the vehicle;

causes a display to display the generated image; and switches a viewpoint of the image to be displayed on the display to a viewpoint where a traveling direction of the vehicle can be visually recognized and an obstacle is displayed on the display, when the obstacle is detected by one or more sensors that detects an obstacle present on the traveling direction side of the vehicle, wherein:

in a case where a plurality of obstacles is detected by the one or more sensors, the obstacles are grouped by directions in which the obstacles exist, and a plurality of groups of the obstacles is obtained, when a group of first obstacles having a smallest distance from the vehicle is present among the groups of the obstacles, and a group of second obstacles having a difference less than a predetermined value is also present, the difference being a difference from the group of the first obstacles with respect to a distance from the vehicle, the processor switches the viewpoint of the image to be displayed on the display to a viewpoint where an obstacle belonging to the group of the first obstacles and an obstacle belonging to the group of the second obstacles are each displayed on the display; and when there is an obstacle hidden in a display of the vehicle in the image, the processor makes the display of the vehicle transparent.

* * * * *